(12) United States Patent
Karstens

(10) Patent No.: US 8,010,998 B2
(45) Date of Patent: Aug. 30, 2011

(54) TECHNIQUES FOR LIMITING REMOTE CONTROL OF A COMPUTER SYSTEM

(75) Inventor: Christopher K. Karstens, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 909 days.

(21) Appl. No.: 11/924,039

(22) Filed: Oct. 25, 2007

(65) Prior Publication Data
US 2009/0113520 A1 Apr. 30, 2009

(51) Int. Cl.
H04L 9/32 (2006.01)
H04L 9/00 (2006.01)
G06F 7/04 (2006.01)

(52) U.S. Cl. ............. 726/3; 726/27; 726/28; 726/29; 726/30; 713/187; 713/188

(58) Field of Classification Search ............... 726/3
See application file for complete search history.

(56) References Cited

U.S. PATENT DOCUMENTS
5,822,435 A * 10/1998 Boebert et al. ............... 713/192
2007/0130618 A1 * 6/2007 Chen ............................. 726/8

* cited by examiner

Primary Examiner — Longbit Chai
(74) Attorney, Agent, or Firm — DeLizio Gilliam, PLLC

(57) ABSTRACT

A technique for limiting remote control of a computer system includes receiving user input via an input device associated with the computer system. The user input is encoded, at the input device, using a first coding procedure to provide an encoded signal, which is communicated to an input queue of the computer system. The encoded signal is then decoded, at the input queue, using the first coding procedure to provide the user input.

22 Claims, 3 Drawing Sheets

TECHNIQUES FOR LIMITING REMOTE CONTROL OF A COMPUTER SYSTEM

BACKGROUND

1. Field

This disclosure relates generally to a computer system and, more specifically, to techniques for limiting remote control of a computer system.

2. Related Art

Today, a local computer system may be configured with remote access software that allows a user of a remote computer system to control various aspects of the local computer system. For example, terminal services is a component of a windows-based operating system (OS) that allows a user of a first computer system to access applications and data stored on a second computer system over a network, e.g., the Internet. The windows-based OS may include a remote assistance (RA) client application and a remote desktop connection (RDC) client application. The RA client application allows a user on a first computer system to receive assistance from another user on a second computer system. The RA client application may, for example, allow a system administrator to diagnose and repair problems with a remote computer system that runs the RA client application. The RDC client application allows a user to login to a server (via a first computer system, e.g., a home computer system) and access a desktop, applications, and data on a second computer system (e.g., a work computer system) that is coupled to the server, as well as control the second computer system.

Unfortunately, a computer system that is capable of being remotely controlled may be subject to remote control without the knowledge or consent of an authorized user of the computer system. Unauthorized remote control of a computer system may facilitate theft of sensitive information stored on the computer system or allow the computer system to be used for nefarious purposes. Unauthorized remote control of a computer system may be facilitated by a virus or a Trojan horse (Trojan) that subverts security built into remote control software. For example, the Trojan horse may disable security features of the remote control software or provide a backdoor in an operating system (OS) of the computer system that allows remote control of the computer system. Moreover, unauthorized remote control of a computer system may be facilitated by an inexperienced user that does not properly configure a firewall or heed warnings provided by the firewall when security of the computer system is compromised.

SUMMARY

According to one aspect of the present disclosure, a technique for limiting remote control of a computer system includes receiving user input via an input device associated with the computer system. The user input is encoded using a first coding procedure at the input device to provide an encoded signal, which is communicated to an input queue of the computer system. The encoded input is then decoded using the first coding procedure to provide the user input at the input queue. According to this approach, the possibility of an unauthorized user of the computer system providing remote input to the computer system is substantially reduced.

According to another aspect of the present disclosure, a technique for limiting remote control of a computer system includes encoding, at an adapter of the computer system, a first signal (e.g., a first video signal) using a first coding procedure to provide a second signal (e.g., a second video signal). The second signal is then communicated to an output device (e.g., a monitor) of the computer system. The second signal is then decoded at the output device using the first coding procedure to provide the first signal. The first signal is then provided using the output device.

According to another embodiment of the present disclosure, a computer system includes an input device and an input queue. The input device is configured to receive user input and is configured to encode the user input with a first coding procedure to provide an encoded signal. The input queue is in communication with the input device and is configured to provide the encoded signal to the input queue, which is configured to decode the encoded signal using the first coding procedure to provide the user input at the input queue.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
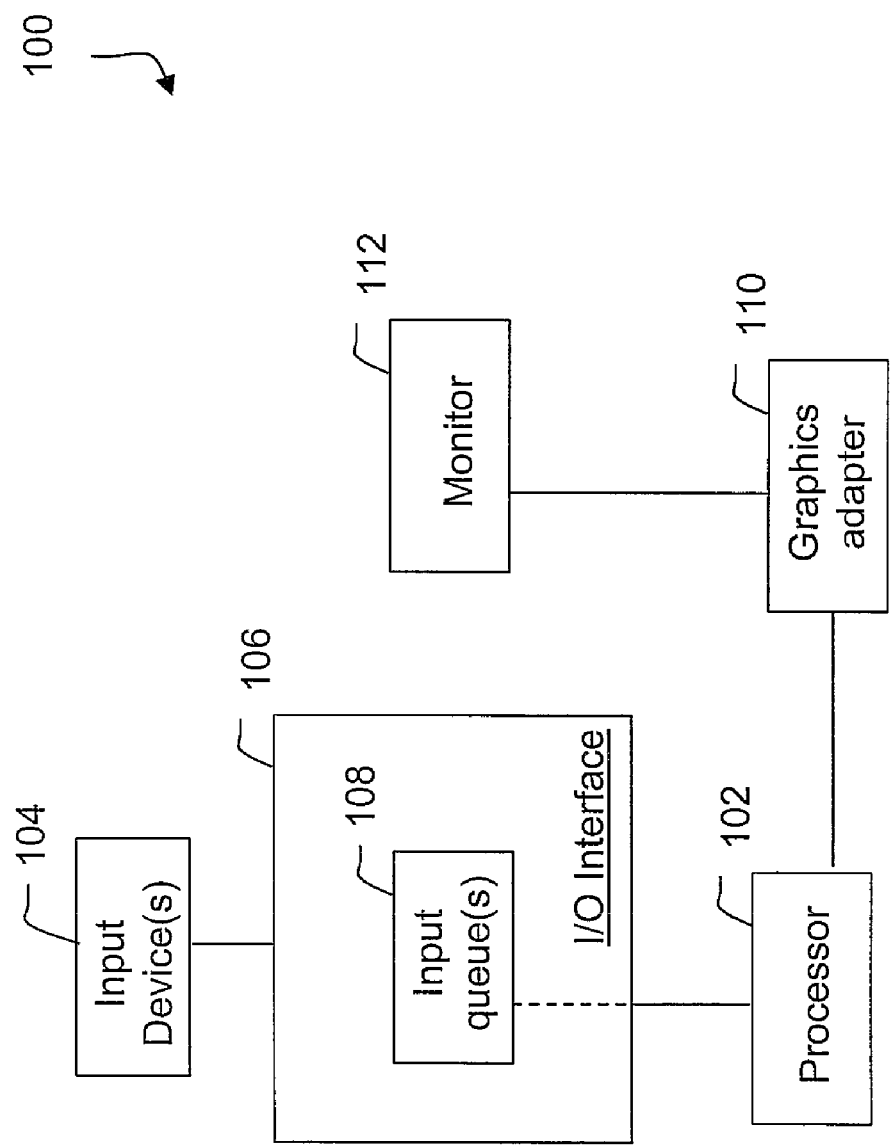
FIG. 1 is a block diagram of a relevant portion of an example computer system, configured according to one or more embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium storage would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks. As used herein, the term "coupled" includes both a direct electrical connection between blocks or components and an indirect electrical connection between blocks or components achieved using intervening blocks or components.

According to various aspects of the present disclosure, techniques are employed to limit unauthorized remote control of a computer system. The disclosed techniques employ synchronized coding procedures between an 'input device' and a 'host device' or between a 'host device' and an 'output device'. As one example, the 'host device' may be a graphics adapter that transmits a coded video signal to an 'output device' that takes the form of a monitor. As another example, an 'input device' may be a keyboard that transmits a coded signal (in response to one or more keystroke entries) to a 'host device' that takes the form of an operating system (OS) keyboard input queue. As yet another example, an 'input device' may be a mouse that transmits a coded signal (in response to mouse movement) to a 'host device' that takes the form of an OS mouse input queue. As another example, an 'input device' may be a microphone that transmits a coded sound signal (in response to speech) to a 'host device' that takes the form of an OS microphone input queue. As yet another example, the 'host device' may be a sound adapter that transmits a coded sound signal to an 'output device' that takes the form of a speaker. It should be appreciated that the host, input, and output devices may take other forms and are not limited to the forms discussed herein.

It should also be appreciated that a wide variety of different types of coding procedures may be employed. For example, a time-based coding procedure may be employed in which a given keystroke that corresponds to one character, symbol, or number at one time corresponds to a different character, symbol, number, etc. at a later time, e.g., a given keystroke that corresponds to an 'A' at a time of 0 milliseconds may correspond to a 'B' at a time that is 5 milliseconds later, etc. As another example, an iteration-based coding procedure may be employed in which a given keystroke corresponds to a different character, number, symbol, etc., each time the given keystroke is entered on a keyboard. For example, in an iteration-based coding procedure, a given keystroke (e.g., 'x') may correspond to a '1' the first time the given keystroke is entered on a keyboard and a '2' the next time the given keystroke is entered on the keyboard. As another example, a rolling code-based coding procedure, similar to what is used for garage door openers, may also be utilized. Moreover, it is contemplated that the techniques disclosed herein are applicable to a wide variety of different types of host, input, and output devices of a computer system.

It should be appreciated that virtually any coding procedure may be employed, according to the present disclosure, providing an 'input device' and a 'host device' and or a 'host device' and an 'output device' have common knowledge of the coding procedure employed. For example, an 'input device' may be assigned an identification (ID) that is provided to an associated 'host device'. The 'host device' may then use the ID of the 'input device' to determine what coding procedure the 'input device' utilized and decode a received signal accordingly. As another example, during initial computer system setup, the different host, input, and output devices can be made aware of the coding procedure(s) utilized. It should be appreciated that multiple coding procedures may be employed within a single computer system. In various embodiments, an employed coding procedure may be selectively disabled when desired. For example, if remote access to the computer system is desired for a given time period, the coding procedure may be disabled. Following the given time period, the coding procedure may be enabled. Alternatively, the coding procedure may be selectively enabled/disabled by an authorized user of the computer system, as desired.

When the input device is a keyboard and the host device is an operating system (OS) keyboard input queue, control of a local computer system by an unauthorized user (using a remote computer system) may be addressed by configuring keyboard hardware to encode keystrokes (user input) at the keyboard, prior to transmission to the keyboard input queue. For example, when a given keystroke corresponds to an 'x' on the keyboard, the keyboard hardware (based on an employed coding procedure) may transmit a coded signal that corresponds to a 'k' (instead of an 'x') to the keyboard input queue. Based on the employed coding procedure, the keyboard input queue interprets the 'k' as an 'x', which may then be displayed on a display screen of a monitor of the computer system. While an unauthorized logging program may be surreptitiously employed on a local computer system to provide information that may allow an unauthorized user to provide legitimate commands to the local computer system (using a keyboard of a remote computer system), it should be appreciated that an unauthorized user would have a difficult time inputting typed commands to the local computer system when a signal associated with a given keystroke is not static. It should also be appreciated that one or more coded signals may be provided for each keystroke.

When the 'input device' is a mouse and the 'host device' is an OS mouse input queue, control of a local computer system by an unauthorized user (using a remote computer system) may be circumvented by configuring mouse hardware to encode mouse movement (user input), i.e., direction and/or distance, at the mouse, prior to transmission to the mouse input queue. For example, when a user moves the mouse in an up-direction (i.e., north or zero degrees) for five milliseconds, the mouse hardware (based on an employed coding procedure) may transmit a series of coded signals at one millisecond intervals as follows: at one millisecond the mouse hardware transmits a first coded signal corresponding to forty-three degrees to the mouse input queue; at two milliseconds the mouse hardware transmits a second coded signal corresponding to two degrees to the mouse input queue; at three milliseconds the mouse hardware transmits a third coded signal corresponding to two-hundred seventy degrees to the mouse input queue; at four milliseconds the mouse hardware transmits a fourth coded signal corresponding to forty-seven degrees to the mouse input queue; and at five milliseconds the mouse hardware transmits a fifth coded signal corresponding to forty-three degrees to the mouse input queue. It should be appreciated that one or more coded signals may be provided by mouse hardware for each uncoded signal that would normally be provided.

Based on the employed coding procedure, the mouse input queue is configured to interpret the series of coded signals as zero degrees and a mouse cursor moves in the up-direction an appropriate distance on a display screen of a monitor of the local computer system. While an unauthorized logging program may be surreptitiously employed on a local computer system to provide information that may allow an unauthorized user to move the mouse cursor to a desired location on a display screen of a monitor of the local computer system (using a mouse of a remote computer system), it should be appreciated that the unauthorized user would be challenged to control the local computer system by moving the mouse cursor to select a desired item when a signal associated with a given mouse movement is not static.

When the 'host device' is a graphics adapter and the 'output device' is a monitor, the possibility of remote control of a local computer system by an unauthorized user (using a remote computer system) may be reduced by configuring graphics adapter hardware to encode a video signal, prior to transmission of the video signal to the monitor. For example, a graphics adapter may be configured to encode a red circle at a top left of an otherwise white display screen as the following series of video signals: a first coded video signal that corresponds to a yellow dot at a center of the display screen; a second coded video signal that corresponds to a blue dot at a top right of the display screen; a third coded video signal that corresponds to an orange dot at a bottom right of the display screen; a fourth coded video signal that corresponds to a pink dot at a middle right of the display screen; and a fifth coded video signal that corresponds to a silver dot at a middle left of the display screen. Based on the employed coding procedure, monitor hardware interprets the coded signals and displays a red circle at a top left of an otherwise white display screen on a monitor of the local computer system. While it is still possible that a unauthorized logging program may be used to provide coded video signals to an unauthorized user (at a remote computer system), it is unlikely that the unauthorized user will be able to derive meaningful video information from the coded video signals, especially when a meaning of coded video signals is not static. It should be appreciated that one or more coded video signals may be provided to a monitor for each uncoded video signal.

With reference to FIG. 1, a relevant portion of an example computer system 100 is illustrated that includes one or more input devices 104 (e.g., a mouse, a keyboard, and a microphone) coupled to an input/output (I/O) interface 106, which includes one or more input queues 108 (e.g., an OS keyboard input queue, an OS mouse input queue, and an OS microphone input queue). Alternatively, the input queues 108 may be located in another portion of the computer system 100. In any case, the input queues 108 are configured to decode encoded user input provided by the input devices 104. The processor 102 is coupled to the I/O interface 106 and a graphics adapter 110. For example, the processor 102 may be coupled to the graphics adapter 110 via an accelerated graphics port (AGP) or a peripheral component interconnect (PCI) bus. A monitor 112 is also coupled to the graphics adapter 110. The monitor 112 may include, for example, a liquid crystal display (LCD) or a cathode ray tube (CRT). The processor 102 may include one or more cores and one or more levels of cache memory.

Figure 2:
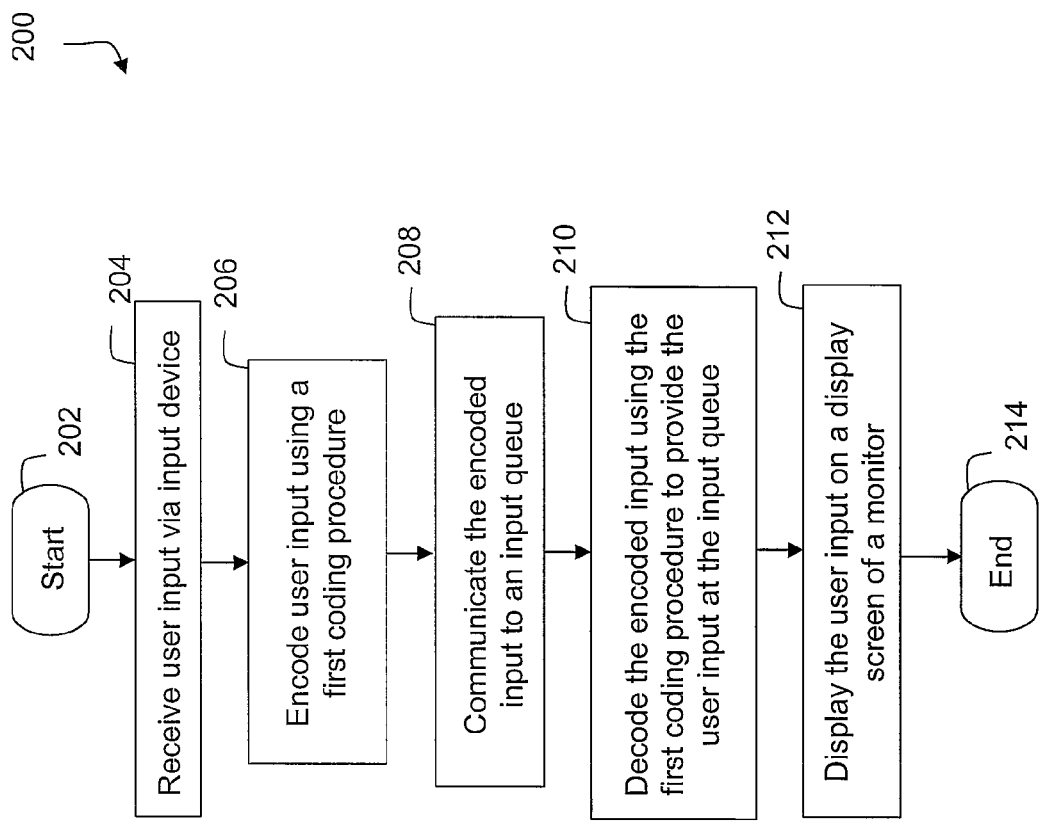
FIG. 2 is a flowchart of an example process for encoding user input, according to one aspect of the present disclosure.

With reference to FIG. 2, an example process 200, for limiting remote control of a computer system according to various aspects of the present disclosure, is illustrated. To facilitate understanding, the process 200 is discussed in conjunction with the computer system 100 of FIG. 1. The process 200 is initiated in block 202, at which point control transfers to block 204 where user input is received from a user via the input device 104. The user input may, for example, correspond to one or more keystrokes entered via a keyboard, or a series of mouse movements (including one or more mouse button actuations). Next, in block 206, the input device 104 encodes the user input using a first coding procedure, e.g., a time-based coding procedure, an iteration-based encoding procedure, a rolling code-based coding procedure, etc., that is known to both the input device 104 and the input queue 108. Then, in block 208, the encoded input is communicated to the input queue 108. Next, in block 210, the input queue 108 decodes the encoded input using the first coding procedure to provide the user input at the input queue 108. Then, the user input is provided to the monitor 112, via the graphics adapter 110, for display on a display screen of the monitor 112. According to various aspects of the present disclosure, the graphics adapter 110 may provide the user input to the monitor 112 in the form of an uncoded video signal or a coded video signal. In either case, the user input is displayed on the display screen of the monitor 112. Following block 212, the process 200 terminates in block 214.

Figure 3:
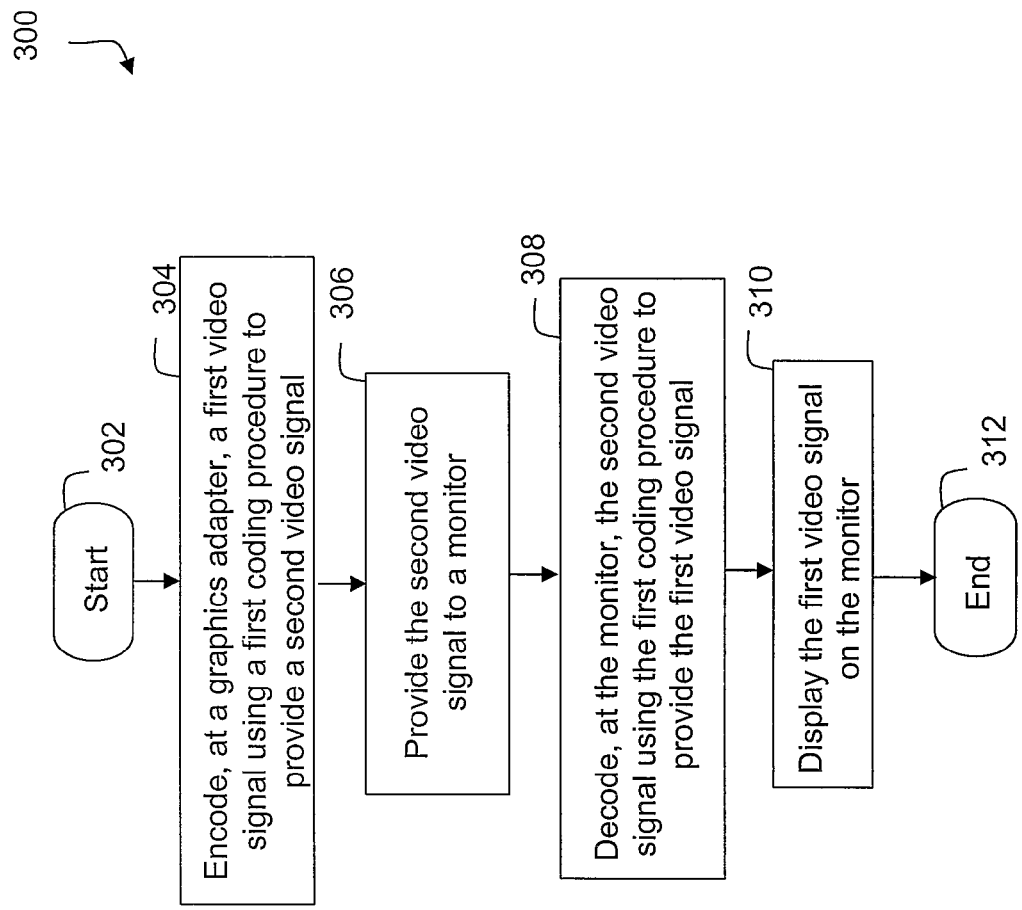
FIG. 3 is a flowchart of an example process for encoding a video signal, according to another aspect of the present disclosure.

With reference to FIG. 3, another example process 300, for limiting remote control of a computer system, according to various aspects of the present disclosure, is illustrated. To facilitate understanding, the process 300 is also discussed in conjunction with the computer system 100 of FIG. 1. The process 300 is initiated in block 302, at which point control transfers to block 304 where a first video signal (i.e., a native video signal) is encoded using a first coding procedure at the graphics adapter 110 to provide a second video signal (i.e., a coded video signal). The first coding procedure may be, for example, a time-based coding procedure, an iteration-based encoding procedure, a rolling code-based coding procedure, etc., that is known to both the graphics adapter 110 and the monitor 112. Then, in block 306, the encoded video signal is communicated to the monitor 112. Next, in block 308, the monitor 112 decodes the encoded video signal using the first coding procedure to provide a native video signal. Next, in block 310, the native video signal is displayed on a display screen of the monitor 112. Following block 310, the process 300 terminates in block 312.

Accordingly, techniques have been disclosed herein that facilitate limiting remote control of a computer system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of limiting remote control of a local computer system, comprising:
    receiving user input via an input device within the local computer system;
    encrypting, at the input device within the local computer system, the user input with a first coding procedure to provide an encrypted signal;
    communicating the encrypted signal to an input queue associated with the input device within the local computer system;
    decrypting, at the input queue within the local computer system, the encrypted signal using the first coding procedure to provide the user input; and
    determining that remote control access of the local computer system by a remote device is authorized to occur during a defined time period;
    disabling the decrypting, at the input queue within the local computer system, of any signals received at the input queue including the encrypted signal during the defined time period; and
    reenabling the decrypting, at the input queue within the local computer system, of signals received at the input queue including the encrypted signal after expiration of the defined time period.

2. The method of claim 1, wherein the first coding procedure is a time-based coding procedure.

3. The method of claim 1, wherein the first coding procedure is an iteration-based coding procedure.

4. The method of claim 1, wherein the first coding procedure is a rolling code-based coding procedure.

5. The method of claim 1, wherein the input device is a keyboard and the input queue is an operating system keyboard input queue.

6. The method of claim 1, wherein the input device is a mouse and the input queue is an operating system mouse input queue.

7. The method of claim 1, further comprising:
    displaying the user input on a display screen of a monitor.

8. A method of limiting remote control of a local computer system, comprising:
    encrypting, at an adapter within the local computer system, a first signal using a first coding procedure to provide a second signal;
    communicating the second signal to an output device within the local computer system;
    decrypting, at the output device within the local computer system, the second signal using the first coding procedure to provide the first signal;
    providing the first signal using the output device within the local computer system; and
    determining that remote control access of the local computer system by a remote device is authorized to occur during a defined time period;
    disabling the decrypting, at the output device within the local computer system, of any signals received at the output device including the first signal during the defined time period; and
    reenabling the decrypting, at the input queue within the local computer system, of signals received at the output device including the first signal after expiration of the defined time period.

9. The method of claim 8, wherein the first coding procedure is a time-based coding procedure.

10. The method of claim 8, wherein the first coding procedure is an iteration-based procedure.

11. The method of claim 8, wherein the first coding procedure is a rolling code-based coding procedure.

12. The method of claim 8, wherein the adapter is a graphics adapter, the first and second signals are video signals, and the output device is a monitor.

13. The method of claim 8, wherein the adapter is a sound adapter, the first and second signals are sound signals, and the output device is a speaker.

14. An apparatus, comprising:
    an input device within a local computer system configured to receive user input, wherein the input device is configured to encrypt the user input with a first coding procedure to provide an encrypted signal; and
    an input queue within the local computer system coupled to the input device, wherein the input device is configured to communicate the encrypted signal to the input queue, and wherein the input queue is configured to decrypt the encrypted signal using the first coding procedure to provide the user input, wherein the input queue is configured to disable decryption of any signals received, including the encrypted signal, during a defined time period when remote control access of the local computer system is authorized, wherein the input queue is configured to reenable decryption of signals received, including the encrypted signal, after expiration of the defined time period.

15. The apparatus of claim 14, wherein the first coding procedure is a time-based coding procedure.

16. The apparatus of claim 14, wherein the first coding procedure is an iteration-based procedure.

17. The apparatus of claim 14, wherein the first coding procedure is a rolling code-based coding procedure.

18. The apparatus of claim 14, wherein the input device is a keyboard and the input queue is an operating system keyboard input queue.

19. The apparatus of claim 14, wherein the input device is a mouse and the input queue is an operating system mouse input queue.

20. The apparatus of claim 14, further comprising:
an adapter within the local computer system coupled to the input queue, wherein the adapter is configured to receive the user input and encrypt the user input with a second coding procedure to provide an encrypted signal; and
an output device within the local computer system coupled to the adapter, wherein the adapter is configured to communicate the encrypted signal to the output device, and wherein the output device is configured to decrypt the encrypted signal using the second coding procedure to provide the user input in the form of a decrypted signal that is provided by the output device,
wherein the output device is configured to disable decryption of any signals received, including the encrypted signal, during a defined time period when remote control access of the local computer system is authorized,
wherein the output device is configured to reenable decryption of signals received, including the encrypted signal, after expiration of the defined time period.

21. The method of claim 1, wherein the input queue within the local computer system is part of the operating system of the local computer system.

22. The method of claim 1, wherein the encoding at the input device within the local computer system comprises encoding within hardware of the input device within the local computer system prior to decoding at the input queue in the operating system within the local computer system.

* * * * *